US011581737B2

(12) United States Patent
Armschat et al.

(10) Patent No.: US 11,581,737 B2
(45) Date of Patent: Feb. 14, 2023

(54) FREQUENCY STABILIZATION ARRANGEMENT

(71) Applicant: Siemens Energy Global GmbH & Co. KG, Munich (DE)

(72) Inventors: Christoph Armschat, Erlangen (DE); Holger Mueller, Moehrendorf (DE); Ervin Spahic, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 226 days.

(21) Appl. No.: 16/643,664

(22) PCT Filed: Aug. 30, 2017

(86) PCT No.: PCT/EP2017/071795
§ 371 (c)(1),
(2) Date: Mar. 2, 2020

(87) PCT Pub. No.: WO2019/042545
PCT Pub. Date: Mar. 7, 2019

(65) Prior Publication Data
US 2020/0274361 A1  Aug. 27, 2020

(51) Int. Cl.
| *H02J 3/14* | (2006.01) |
| *H02J 3/32* | (2006.01) |
| *H02J 3/24* | (2006.01) |
| *H02J 3/38* | (2006.01) |
| *H02M 7/483* | (2007.01) |

(52) U.S. Cl.
CPC ............... *H02J 3/32* (2013.01); *H02J 3/14* (2013.01); *H02J 3/241* (2020.01); *H02J 3/381* (2013.01); *H02M 7/483* (2013.01); *H02J 2300/24* (2020.01)

(58) Field of Classification Search
CPC .... H02J 3/241; H02J 3/14; H02J 3/381; H02J 3/32; H02M 7/483
See application file for complete search history.

(56) References Cited

U.S. PATENT DOCUMENTS 3,530,300 A * 9/1970 Smith ................. H02J 3/14
307/33
4,292,545 A * 9/1981 Hingorani ............ H02J 3/1807
307/102

(Continued)

FOREIGN PATENT DOCUMENTS

CN  201323449 Y  * 10/2009
CN  102290826 A  * 12/2011

(Continued)

OTHER PUBLICATIONS

PCT International Search Report and Written Opinion of International Searching Authority dated May 23, 2018 corresponding to PCT International Application No. PCT/EP2017/071795 filed Aug. 30, 2017.

Primary Examiner — Harry R Behm
(74) Attorney, Agent, or Firm — Laurence A. Greenberg; Werner H. Stemer; Ralph E. Locher

(57) ABSTRACT

A frequency stabilization arrangement for a power transmission grid has a modular multi-level converter with a first terminal for electrical connection to a power transmission grid, and an electrical resistor unit with a second terminal for electrical connection to the power transmission grid.

11 Claims, 6 Drawing Sheets

(56) References Cited

U.S. PATENT DOCUMENTS

Figure 1:
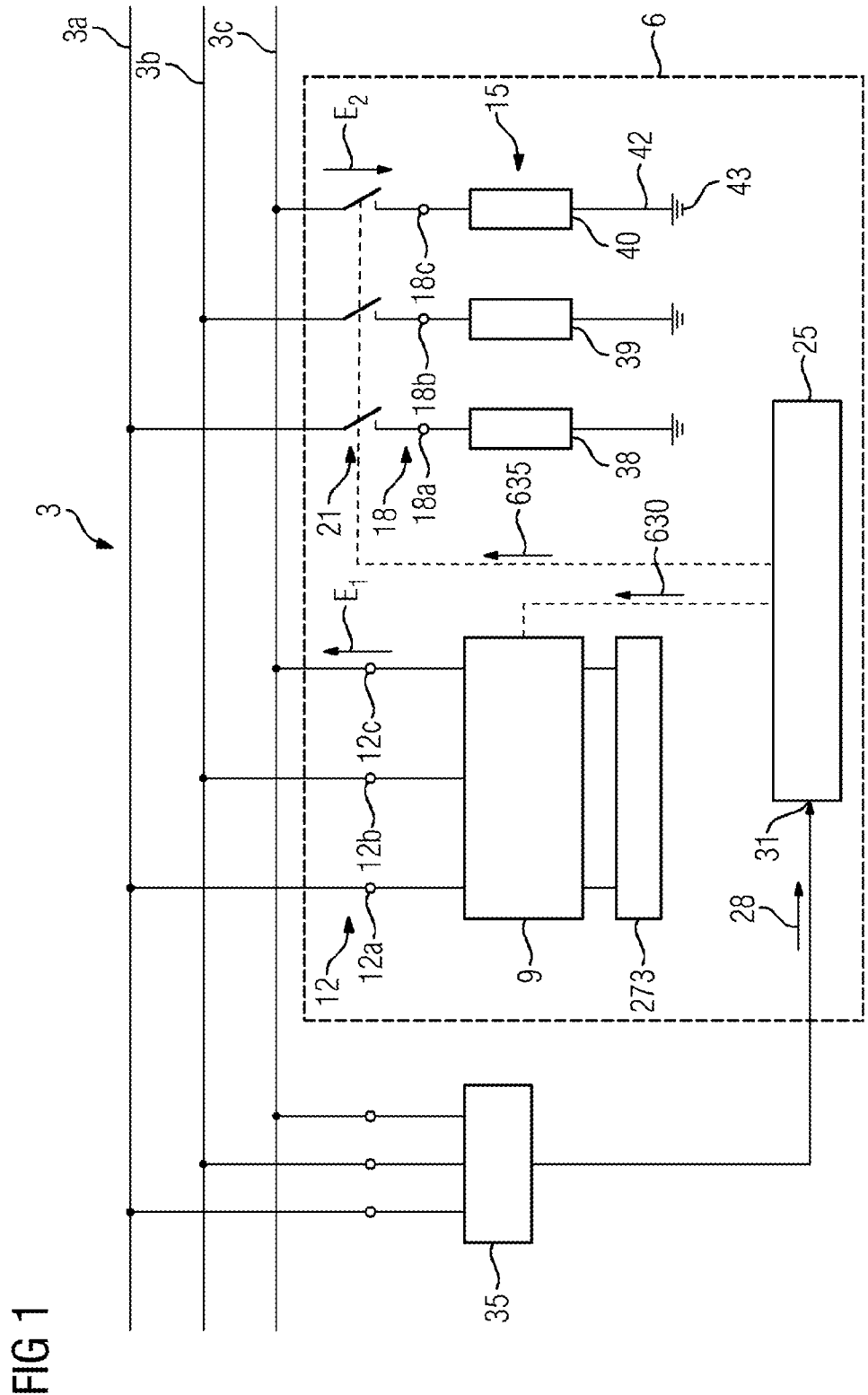

| | | | |
|---|---|---|---|
| 2012/0080420 A1* | 4/2012 | Hui | H02J 3/241 |
| | | | 219/482 |
| 2015/0155770 A1* | 6/2015 | Ying | H02M 1/08 |
| | | | 307/52 |
| 2015/0340866 A1 | 11/2015 | Ploett | |
| 2016/0254668 A1* | 9/2016 | Huang | H02J 3/50 |
| | | | 307/64 |
| 2016/0315473 A1* | 10/2016 | Lebel | H02J 3/14 |
| 2017/0366008 A1* | 12/2017 | Simburger | H02J 3/38 |
| 2018/0233912 A1* | 8/2018 | Spahic | H02J 7/0014 |

FOREIGN PATENT DOCUMENTS

| | | | | |
|---|---|---|---|---|
| CN | 105656051 A * | 6/2016 | | H02J 3/14 |
| DE | 102008024222 A1 | 2/2009 | | |
| EP | 3200302 A1 | 8/2017 | | |
| WO | 2014000770 A1 | 1/2014 | | |
| WO | WO-2015051817 A1 * | 4/2015 | | H02J 3/34 |

* cited by examiner

FREQUENCY STABILIZATION ARRANGEMENT

The invention relates to an arrangement and a method for frequency stabilization of a power transmission grid.

Ensuring a constant frequency is of ever-greater significance in power transmission grids. One reason for this is that non-central power generators (wind power installations and photovoltaic installations in particular) are increasingly connected via power electronic operating means to the power transmission grids. This means that rotating masses such as are available in classic generators are no longer available. In the case of a fault (e.g. the failure of a large energy generator or a large energy consumer, or in the event of an unwanted grid disconnection) the frequency in the power transmission grid can therefore change very quickly toward frequency values that are too small or toward frequency values that are too large, and can thus endanger the grid security. In the past, such frequency changes were slowed up by the rotating masses of conventional power generators (inertia) and their extreme values (maximum and minimum values) were limited.

The invention is based on the object of providing an arrangement and a method with which the frequency of a power transmission grid can be stabilized.

This object is achieved according to the invention by an arrangement and by a method as claimed in the independent patent claims. Advantageous forms of embodiment of the arrangement are given in the dependent patent claims.

An arrangement is disclosed for frequency stabilization of a power transmission grid with a modular multi-level converter that comprises a first terminal (converter terminal) for electrical connection to a power transmission grid, and with an electrical resistor unit (high-power resistor unit) that comprises a second terminal (units terminal) for electrical connection to the power transmission grid. This arrangement advantageously makes it possible to feed electrical energy into the power transmission grid by means of the multi-level converter (and thus, when required, to support, i.e. to increase, the frequency of the power transmission grid) or to remove electrical energy from the power transmission grid by means of the electrical resistor unit and thus, if required, to reduce the frequency of the power transmission grid. Thus in the event of an unwanted frequency drop in the power transmission grid, the modular multi-level converter is activated in order to feed an alternating current of an appropriate frequency into the power transmission grid and thereby to support the frequency. In the event of an unwanted frequency rise in the power transmission grid, the electrical resistor unit is activated in order to remove electrical energy from the power transmission grid and thereby to lower the frequency of the power transmission grid.

The arrangement can thus be designed such that the resistor unit is connected to a switching device that enables a switchable electrical connection of the resistor unit to the power transmission grid. The switching device here connects the second terminal of the resistor unit to the power transmission grid. The switching device advantageously enables the resistor unit only to be activated when needed, i.e. a flow of current from the power transmission grid to the resistor unit to be enabled. The switching device in particular enables the resistor unit only to be activated in the event of a frequency of the power transmission grid that is too high.

The arrangement can also be so designed that the multi-level converter comprises a plurality of modules each of which comprises at least two electronic switching elements and an electrical capacitor. Modules of this type of a modular multi-level converter are also known as submodules. By means of these modules, the multi-level converter is able to generate almost any desired output voltages at the first terminal.

The arrangement can also be designed such that the two electronic switching elements of the modules are arranged in a half-bridge circuit, or the modules each comprise the two electronic switching elements and two further electronic switching elements, wherein the two electronic switching elements and the two further electronic switching elements are arranged in a full-bridge circuit. These modules are also referred to as half-bridge modules or half-bridge submodules, or as full-bridge modules or full-bridge submodules.

The arrangement can also be designed such that the modular multi-level converter is connected (on the direct voltage side) to a (central) energy store. The electrical energy stored in this energy store can be fed by means of the multi-level converter into the power transmission grid in the event that a frequency of the power transmission grid is undesirably too low. The frequency of the power transmission grid can be raised thereby. In contrast with the non-central (distributed) capacitors of the modules, the energy store connected to the multi-level converter on the direct voltage side is implemented centrally in the arrangement, i.e. all the modules of the multi-level converter are supplied by the central energy store in the event that the frequency falls too low. This energy store has a higher electrical storage capacity than the individual capacitors of the modules. The energy store also has a higher electrical voltage than the individual capacitors of the modules.

The arrangement can also be so designed that the (central) energy store comprises a plurality of mutually interconnected energy storage units. By means of an energy store constructed in this way, relatively large quantities of energy can advantageously be stored, so that the frequency of the power transmission grid can be supported by means of the arrangement for a relatively long period of time.

The arrangement can be so designed that the energy storage units are capacitors and/or batteries.

The arrangement can also comprise a control device that operates the multi-level converter and the switching device in such a way that when a frequency of an alternating current transmitted over the power transmission grid falls below a target frequency by more than a predetermined shortfall tolerance value, or when the change over time of the frequency of the alternating current transmitted over the power transmission grid falls below a first threshold value, the multi-level converter draws electrical energy out of the energy store and (by means of a feed alternating current having the target frequency) feeds it into the power transmission grid (so that the frequency of the alternating current rises) and when the frequency of the alternating current transmitted via the power transmission grid exceeds the target frequency by more than a predetermined excess tolerance value, or when the change over time of the frequency of the alternating current transmitted via the power transmission grid exceeds a second threshold value, the switching device closes and (the switching device) thereby transmits electrical energy from the power transmission grid to the resistor unit, whereupon the resistor unit converts this electrical energy into heat (so that the frequency of the alternating current of the power transmission grid falls).

The control device thus advantageously operates both the multi-level converter as well as the switching device. The control device can thereby either activate the multi-level converter in order to feed energy into the power transmission grid, or close the switching device (and thereby activate the resistor unit) in order to remove energy from the power transmission grid by means of the resistor unit.

The arrangement can however also comprise a control device that operates the multi-level converter and the switching device in such a way that when a frequency of an alternating current transmitted via the power transmission grid falls short of a target frequency by more than a predetermined shortfall tolerance value, the multi-level converter removes electrical energy from the energy store and (by means of a feed alternating current having the target frequency) feeds it into the power transmission grid (so that the frequency of the alternating current rises) and when the frequency of the alternating current transmitted via the power transmission grid exceeds the target frequency by more than a predetermined excess tolerance value, the switching device closes and (the switching device) thereby transmits electrical energy from the power transmission grid to the resistor unit, whereupon the resistor unit converts this electrical energy into heat (so that the frequency of the alternating current of the power transmission grid falls).

In this variant, only the frequency is evaluated, but not the change over time of the frequency.

A method for frequency stabilization of a power transmission grid, wherein the power transmission grid is connected to a modular multi-level converter which is connected (on the direct voltage side) to an energy store, and wherein the power transmission grid is connected via a switching device to an electrical resistor unit (in particular a high-power resistor unit), is further disclosed, wherein, in the method the frequency of an alternating current transmitted over the power transmission grid is ascertained, when the ascertained frequency falls below a target frequency by more than a predetermined shortfall tolerance value, or when the change over time of the frequency falls below a first threshold value, electrical energy is drawn out of an energy store by the multi-level converter and (by means of a feed alternating current having the target frequency) fed into the power transmission grid (so that the frequency of the alternating current of the power transmission grid rises) and when the ascertained frequency exceeds the target frequency by more than a predetermined excess tolerance value, or when the change over time of the frequency exceeds a second threshold value, the switching device is closed, whereby electrical energy is transmitted from the power transmission grid to the resistor unit and converted there into heat (so that the frequency of the alternating current of the power transmission grid falls).

The method can, in particular, also be a method for frequency stabilization of a power transmission grid, wherein the power transmission grid is connected to a modular multi-level converter which is connected (on the direct voltage side) to an energy store, and wherein the power transmission grid is connected via a switching device to an electrical resistor unit (in particular a high-power resistor unit), wherein, in the method the frequency of an alternating current transmitted over the power transmission grid is ascertained, the ascertained frequency is compared with a target frequency, when the ascertained frequency falls below the target frequency by more than a predetermined shortfall tolerance value, electrical energy is drawn out of an energy store by the multi-level converter and (by means of a feed alternating current having the target frequency) fed into the power transmission grid (so that the frequency of the alternating current of the power transmission grid rises) and when the ascertained frequency exceeds the target frequency by more than a predetermined excess tolerance value, the switching device is closed, whereby electrical energy is transmitted from the power transmission grid to the resistor unit and converted there into heat (so that the frequency of the alternating current of the power transmission grid falls).

In this method, only the frequency is evaluated, but not the change over time of the frequency.

The methods have the same advantages as are presented above in connection with the arrangement.

Figure 2:
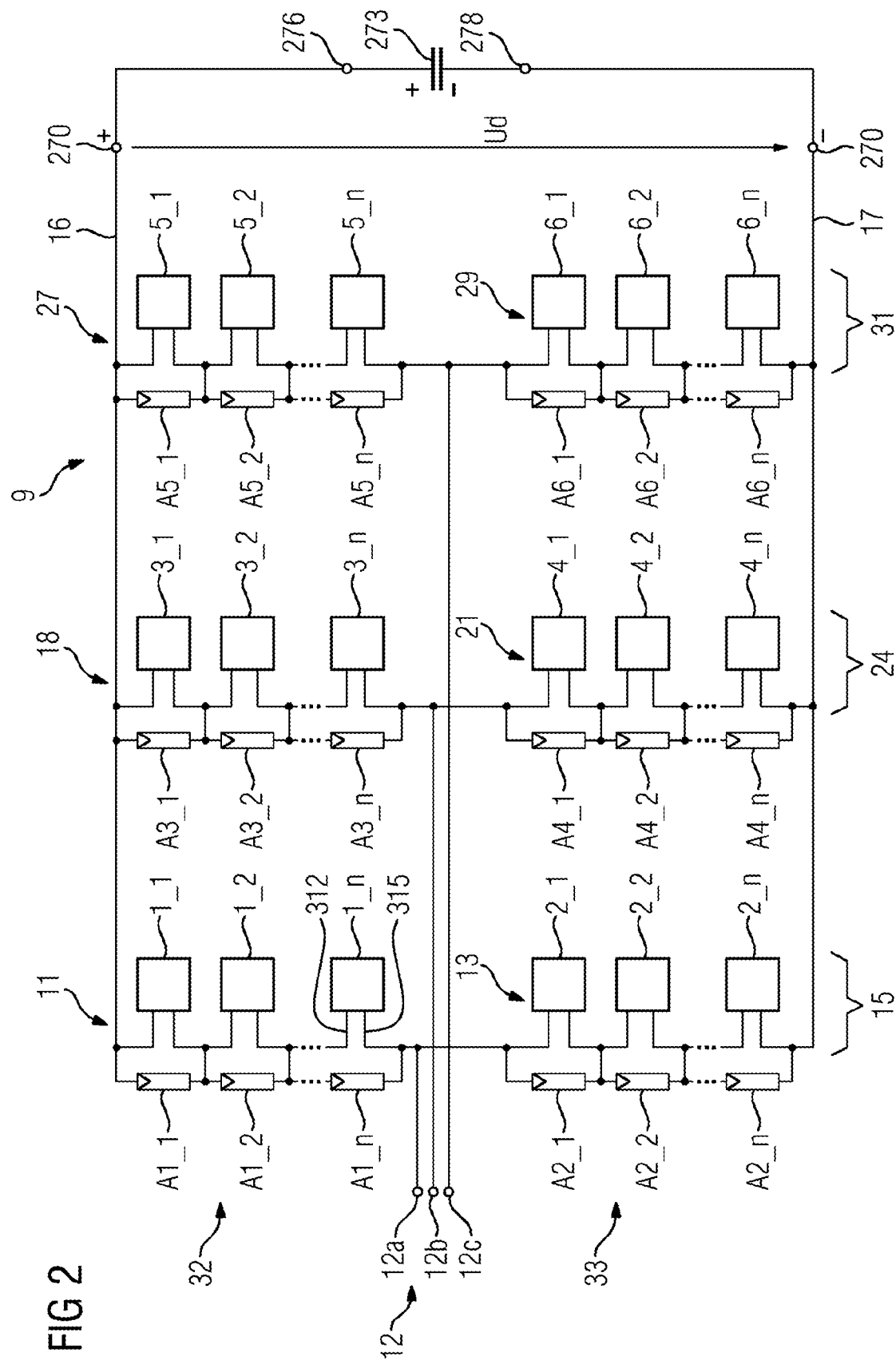
Figure 3:
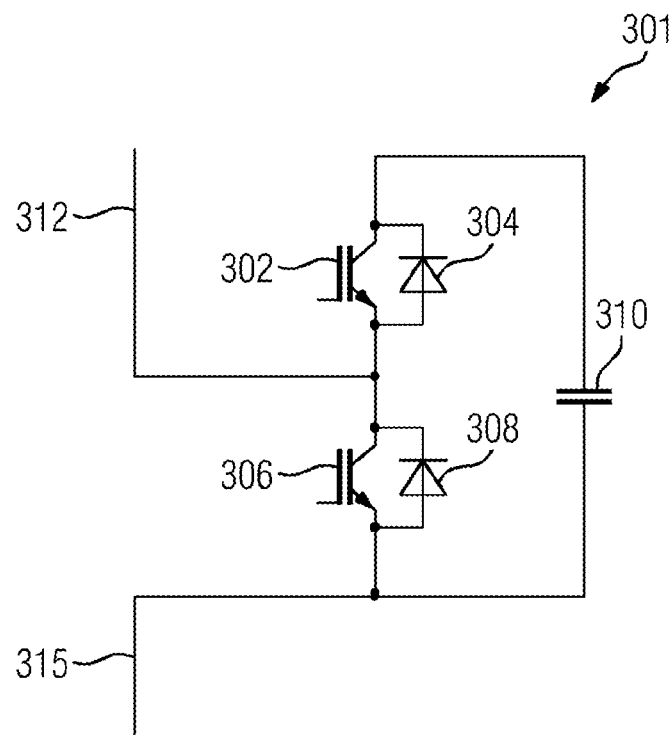
Figure 4:
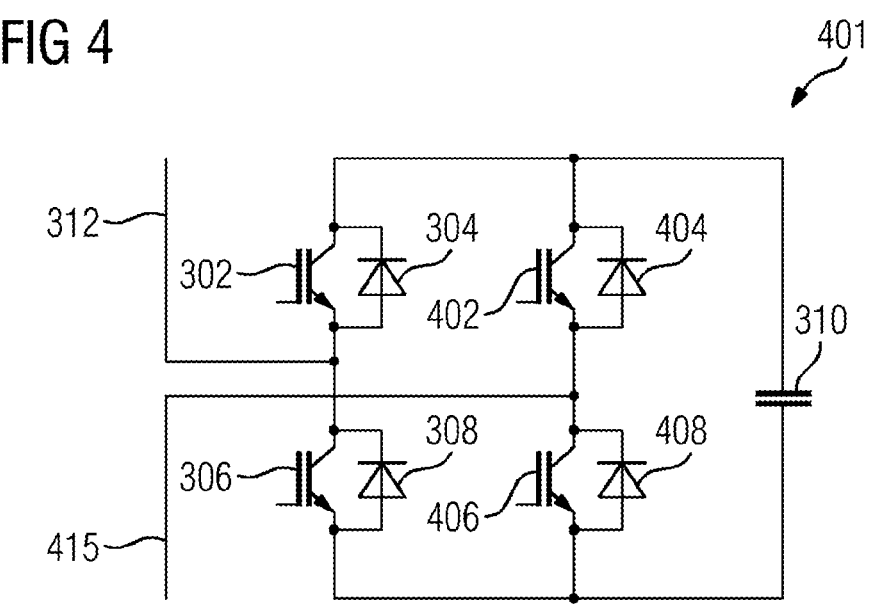
Figure 5:
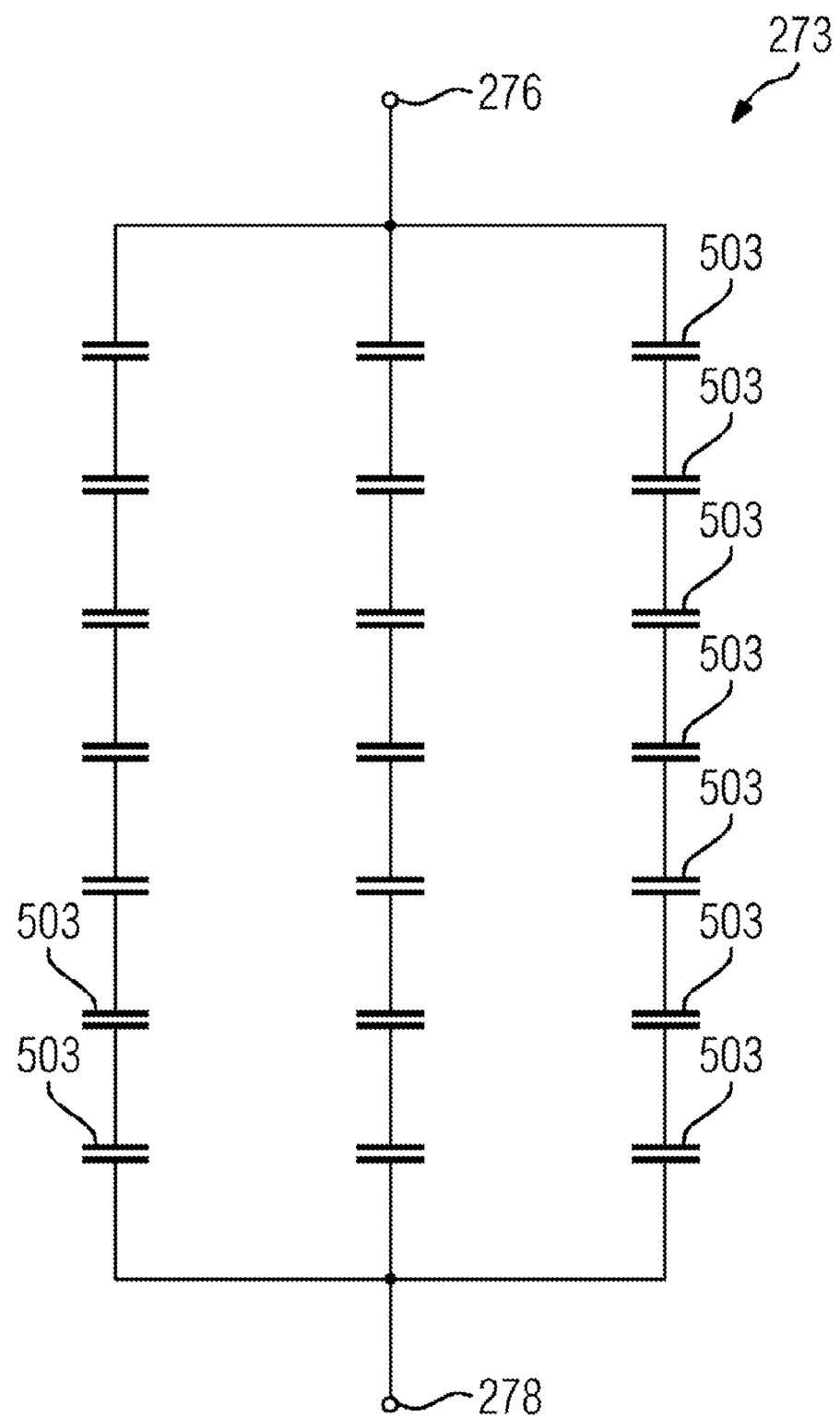
Figure 6:
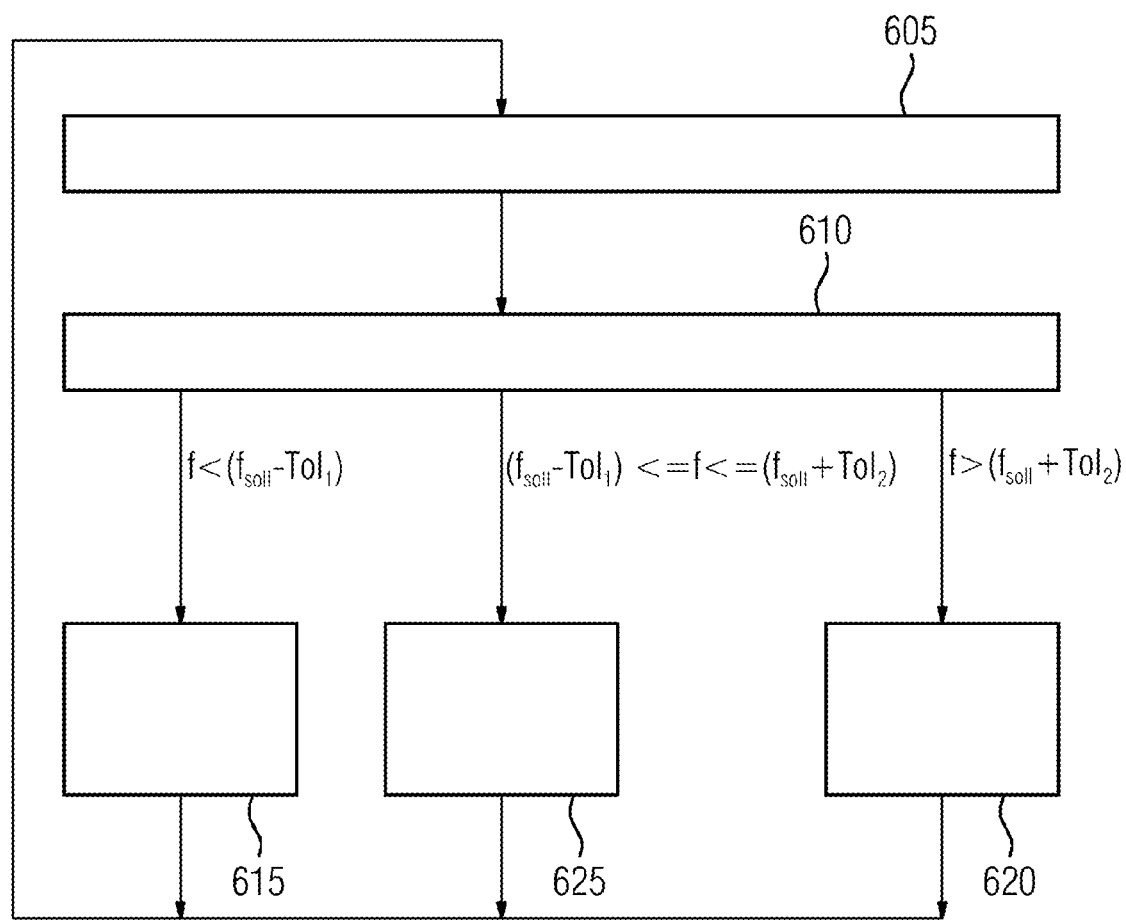
Figure 7:
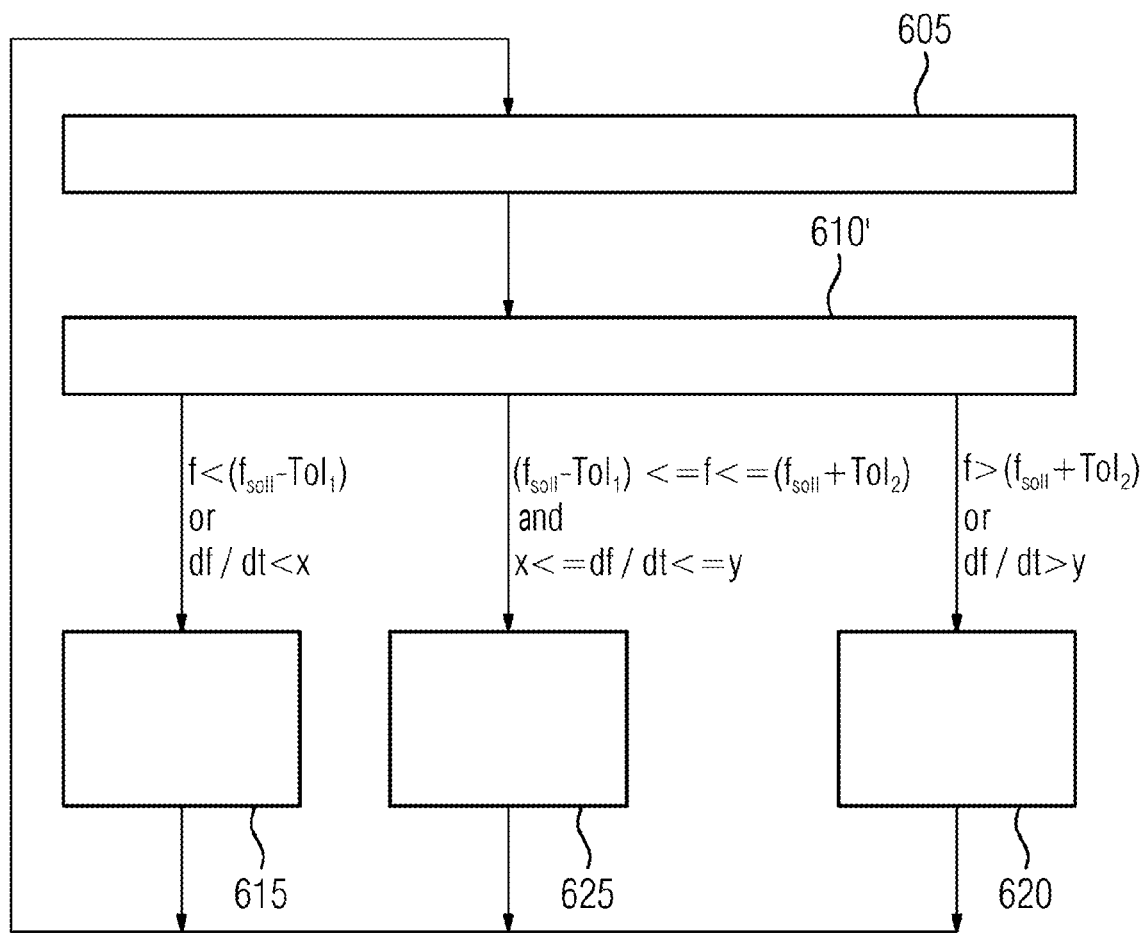

The invention is explained in more detail below with reference to exemplary embodiments. The same reference signs here refer to elements that are the same or that act in the same way. Here FIG. 1 shows an exemplary embodiment of an arrangement for frequency stabilization with a modular multi-level converter and a resistor unit, FIG. 2 shows an exemplary embodiment of the modular multi-level converter with a connected energy store, FIG. 3 shows an exemplary embodiment of a module of the multi-level converter, FIG. 4 shows a further exemplary embodiment of a module of the multi-level converter, FIG. 5 shows an exemplary embodiment of the energy store, FIG. 6 shows an exemplary illustration of a method flow for frequency stabilization of a power transmission grid, and FIG. 7 shows an exemplary illustration of a further method flow for frequency stabilization of a power transmission grid.

An exemplary embodiment with a three-phase power transmission grid 3 with three phase conductors 3a, 3b and 3c is illustrated in FIG. 1. An arrangement 6 for frequency stabilization of this power transmission grid is connected to the power transmission grid 3. The arrangement 6 comprises a modular multi-level converter 9. The modular multi-level converter 9 comprises a first terminal 12 (converter terminal 12) which is connected to the phase conductors 3a, 3b, 3c of the power transmission grid 3. The modular multi-level converter 9 is connected to an energy store 273, see also FIG. 2.

The arrangement 6 further comprises a resistor unit 15. A terminal 18 (unit terminal 18) of the resistor unit 15 (which is also referred to below as the second terminal 18) is connected via a switching device 21 to the phase conductors 3a, 3b and 3c of the power transmission grid 3. The multi-level converter 9 and the resistor unit 15 are connected here (by means of the switching device 21) in parallel to the power transmission grid 3. The multi-level converter 9 can therefore either feed energy into the power transmission grid 3 or the resistor unit 15 can draw energy out of the power transmission grid 3.

A control device 25 of the arrangement 6 operates both the modular multi-level converter 9 and the switching device 21. This is suggested in each case by means of a dashed line. The control device 25 is supplied with a measured value 28 of the frequency of the power transmission grid 3. This measured value 28 (or the actual frequency value 28) is present at an input 31 of the control device 25. The measured frequency value 28 is generated, in the exemplary embodiment, by a frequency measuring device 35 which measures the frequency of the power transmission grid (or, put more precisely, the frequency of the alternating current being transmitted in the power transmission grid). The frequency measuring device 35 is connected for this purpose to the phase conductors 3a, 3b, 3c of the power transmission grid 3. The frequency measuring device 35 can be part of the arrangement 6. The frequency measuring device 35 can, however, also be arranged outside the arrangement 6, and it is possible for only the measured frequency value 28 to be transmitted to the arrangement 6. The last-named case is illustrated in FIG. 1. Frequency measuring devices 35 are known per se, and therefore do not need to be explained in more detail here.

The resistor unit 15 can, in particular, be a high-power resistor unit. Large amounts of electrical energy can be converted into heat energy by means of this resistor unit 15. In the exemplary embodiment, the resistor unit 15 comprises three resistor elements 38, 39 and 40. Each of the three resistor elements is here assigned to one phase conductor of the power transmission grid 3. The first resistor element 38 is thus assigned to the first phase conductor 3a, the second resistor element 39 is assigned to the second phase conductor 3b, and the third resistor element 40 to the third phase conductor 3c. In the exemplary embodiment of FIG. 1, one terminal of the resistor element is respectively connected via the switching device 21 to the phase conductor. The other terminal of the resistor element is connected electrically (in particular via a ground electrode 42) to the ground potential 43. A first terminal 18a of the first resistor element 38 is thus connected via the switching device 21 to the first phase conductor 3a; the second terminal of the first resistor element 38 is connected to the ground potential. In the same way, a first terminal 18b of the second resistor element 39 is also connected via the switching device 21 with the second phase conductor 3b; and a first terminal 18c of the third resistor element 40 is connected via the switching device 21 to the third phase conductor 3c.

The resistor unit 15 can also, however, be configured otherwise: the three resistor elements 38, 39 and 40 can also, for example, be connected to the ground potential via a common ground electrode. In a further exemplary embodiment, the three resistor elements 38, 39 and 40 can be arranged in a star circuit, and the neutral point can be connected to the ground potential 43 via a ground electrode. In yet another further exemplary embodiment, the three resistor elements 38, 39 and 40 can be arranged in a delta circuit; in this case, a connection to the ground potential is not necessary.

An exemplary embodiment of the modular multi-level converter 9 is illustrated in FIG. 2. The multi-level converter 9 comprises the first terminal 12 for connection to the phase conductor of the power transmission grid 3. The first terminal 12 here comprises a first alternating voltage terminal 12a, a second alternating voltage terminal 12b and a third alternating voltage terminal 12c.

The first alternating voltage terminal 12a is connected electrically to a first phase module branch 11 and a second phase module branch 13. The first phase module branch 11 and the second phase module branch 13 form a first phase module 15 of the power converter 9. The end of the first phase module branch 11 that faces away from the first alternating voltage terminal 12a is connected electrically to a first direct voltage terminal 16; the end of the second phase module branch 13 that faces away from the first alternating voltage terminal 12a is connected electrically to a second direct voltage terminal 17. The first direct voltage terminal 16 is a positive direct voltage terminal; the second direct voltage terminal 17 is a negative direct voltage terminal. A direct voltage Ud is present between the first direct voltage terminal 16 and the second direct voltage terminal 17.

The second alternating voltage terminal 12b is connected electrically to one end of a third phase module branch 18 and to one end of a fourth phase module branch 21. The third phase module branch 18 and the fourth phase module branch 21 form a second phase module 24. The third alternating voltage terminal 12c is connected electrically to one end of a fifth phase module branch 27 and to one end of a sixth phase module branch 29. The fifth phase module branch 27 and the sixth phase module branch 29 form a third phase module 31.

The end of the third phase module branch 18 that faces away from the second alternating voltage terminal 12b and the end of the fifth phase module branch 27 that faces away from the third alternating voltage terminal 12c are connected electrically to the first direct voltage terminal 16. The end of the fourth phase module branch 21 that faces away from the second alternating voltage terminal 12b and the end of the sixth phase module branch 29 that faces away from the third alternating voltage terminal 12c are connected electrically to the second direct voltage terminal 17. The first phase module branch 11, the third phase module branch 18 and the fifth phase module branch 27 form a positive-side power converter part 32; the second phase module branch 13, the fourth phase module branch 21 and the sixth phase module branch 29 form a negative-side power converter part 33.

Each phase module branch comprises a plurality of modules (1_1, 1_2, 1_3 . . . 1_n; 2_1 . . . 2_n; etc.), which are connected electrically in series (by means of their galvanic current terminals). Such modules are also referred to as submodules. In the exemplary embodiment of FIG. 1, each phase module branch comprises n modules. The number of modules connected electrically in series can vary greatly; at least two modules are connected in series, but also, for example, 3, 50, 100 or more modules can be connected electrically in series. In the exemplary embodiment, n=36: the first phase module branch 11 thus comprises 36 modules 1_1, 1_2, 1_3, . . . 1_36. The other phase module branches 13, 18, 21, 27 and 29 have the same construction.

Optical messages or optical signals are transmitted over an optical communication connection (over an optical fiber, for example) to the individual modules 1_1 to 6_n by the control device 25 of the converter 9. The control device in each case sends, for example, a target value for the height of the output voltage that the respective module should provide to the individual modules. These optical messages or optical signals form the converter operation signal 630; see FIG. 1.

The modules 1_1 to 6_n are each optionally provided with an overvoltage arrester A1_1 to A6_n. The overvoltage arrester connected here in parallel with the respective module. Each overvoltage arrester protects the module that is assigned to it from excessive voltage.

The first direct voltage terminal 16 and the second direct voltage terminal 17 form an energy store terminal 270 of the multi-level converter 9. An electrical energy store 273 is connected to the energy store terminal 270. The energy store terminal 270 is a direct voltage terminal of the modular multi-level converter 9. The energy store 273 is thus connected on the direct voltage side with the modular multi-level converter 9, or connected to the modular multi-level converter 9.

The energy store 273 is a unipolar energy store, i.e. the energy store 273 comprises a positive energy store terminal 276 and a negative energy store terminal 278. The energy store 273 makes the electrical energy available to the multi-level converter 9. As a result, the multi-level converter 9 can, when required, feed electrical energy $E_1$ into the power transmission grid 3 via the first terminal 12.

An exemplary embodiment of a module 301 of the modular multi-level converter 9 is illustrated in FIG. 3. This can, for example, be the module 1_1 or one of the other modules of the modular multi-level converter 9.

The module 301 is designed as a half-bridge module 301. The module 301 comprises a first electronic switching element 302 which can be switched on and off (first electronic switching element 302) with a first antiparallel-connected diode 304 (first freewheeling diode 304). The module 301 further comprises a second electronic switching element 306 which can be switched on and off (second electronic switching element 306) with a second antiparallel-connected diode 308 (second freewheeling diode 308) and an electrical capacitor 310. The first electronic switching element 302 and the second electronic switching element 306 are each designed as an IGBT (insulated-gate bipolar transistor). The first electronic switching element 302 is connected electrically in series with the second electronic switching element 306. A first (galvanic) module terminal 312 is arranged at the connection point between the two electronic switching elements 302 and 306. A second (galvanic) module terminal 315 is arranged at the terminal of the second switching element 306, which is located opposite to the connection point. The second module terminal 315 is furthermore connected to a first terminal of the capacitor 310; a second terminal of the capacitor 310 is connected electrically to the terminal of the first switching element 302, which is located opposite to the connection point.

The capacitor 310 is thus connected electrically in parallel with the series circuit of the first switching element 302 and the second switching element 306. Through appropriate drive of the first switching element 302 and the second switching element 306 it is possible to ensure that either the voltage of the capacitor 310 is output between the first module terminal 312 and the second module terminal 315, or that no voltage is output (i.e. a zero voltage is output). Through the interaction of the modules of the individual phase module branches, the output voltage of the power converter desired at a given time can be generated. The operation of the first switching element 302 and of the second switching element 306 takes place by means of the converter drive signal 630 transmitted from the control device 25 to the converter 9.

A further exemplary embodiment of a module 401 of the modular multi-level converter 9 is illustrated in FIG. 4. This can, for example, be the module 1_1 or one of the other modules of the modular multi-level converter 9.

In addition to the first electronic switching element 302, the second electronic switching element 306, first freewheeling diode 304, second freewheeling diode 308 and capacitor 310 already known from FIG. 3, the module 401 illustrated in FIG. 4 comprises a third electronic switching element 402 with a third antiparallel-connected freewheeling diode 404, as well as a fourth electronic switching element 406 with a fourth antiparallel-connected freewheeling diode 408. The third electronic switching element 402 and the fourth electronic switching element 406 are each designed as an IGBT.

In contrast to the circuit of FIG. 3, the second module terminal 415 is not connected electrically to the second electronic switching element 306, but to a central point of an electrical series circuit consisting of the third electronic switching element 402 and the fourth electronic switching element 406.

The module 401 of FIG. 4 is what is known as a full-bridge module 401. This full-bridge module 401 is characterized in that with appropriate drive of the four electronic switching elements between the first module terminal 312 and the second module terminal 415, optionally either the positive voltage of the capacitor 310, the negative voltage of the capacitor 310, or a voltage with the value zero (zero voltage) can be output. Therefore, the polarity of the output voltage can thus be reversed by means of the full-bridge module 401. The power converter 9 can comprise either just half-bridge modules 301, just full-bridge modules 401, or half-bridge modules 301 and full-bridge modules 401.

An exemplary embodiment of the energy store 273 is illustrated in more detail in FIG. 5. The energy store 273 comprises a plurality of mutually interconnected energy storage units 503. In the exemplary embodiment, these energy storage units 503 are connected electrically in series, so forming energy storage unit series circuits.

Three such energy storage unit series circuits are connected in parallel and form the energy store 273. The schematic illustration of FIG. 5 is only to be understood as exemplary. Other numbers of energy storage units 503 can, naturally, be connected in series or in parallel in different energy stores. It is possible through the series interconnection of the energy storage units to provide high voltages by means of the energy store 273. It is possible through the parallel interconnection of the three series circuits to provide high current magnitudes by means of the energy store 273. The energy storage units 503 can, in principle, be any desired electrical energy storage units, in particular capacitors or batteries. What are known as supercaps can, in particular, be employed as capacitors.

An exemplary method flow for frequency stabilization of the power transmission grid 3 is illustrated in FIG. 6. This method flow will be described in more detail below with reference to FIGS. 6 and 1.

In a first method step 605, the frequency f of an alternating current transmitted over the power transmission grid 3 is ascertained. This determination of the frequency f takes place, in the exemplary embodiment, by means of the frequency measuring device 35 that is connected to the power transmission grid 3. The measured value 28 of the ascertained frequency is transmitted by the frequency measuring device 35 to the control device 25.

In a second method step 610, the frequency f ascertained in the control device 25 is compared with an already-known target frequency $f_{soll}$. When the ascertained frequency f falls short of the target frequency $f_{soll}$ by more than a predetermined shortfall tolerance value $Tol_1$, the third method step 615 is carried out. When the ascertained frequency f exceeds the target frequency $f_{soll}$ by more than a predetermined excess tolerance value $Tol_2$, the fourth method step 620 is carried out. When the ascertained frequency f lies within a tolerance range formed by the shortfall tolerance value $Tol_1$ and the excess tolerance value $Tol_2$ about the target frequency $f_{soll}$, then the fifth method step 625 is carried out.

When the frequency f of the power transmission grid is too low (under frequency) (if, in other words, the ascertained frequency f is lower than the tolerance range defined by the shortfall tolerance value $Tol_1$ about the target frequency $f_{soll}$, f<($f_{soll}$−$Tol_1$)), then the third method step 615 is thus carried out. In the third method step 615, a converter operation signal 630 is transmitted to the modular multi-level converter 9 by the control device 25. With this converter operation signal 630, the multi-level converter 9 is instructed to take electrical energy out of the energy store 273 and to feed this electrical energy $E_1$ (by means of an alternating current (feed alternating current) with the target frequency $f_{soll}$) into the power transmission grid 3 via the first terminal 12. The frequency of an alternating current flowing in the power transmission grid 3 is thereby supported, i.e. the frequency of the alternating current flowing in the power transmission grid 3 rises. The frequency of the power transmission grid 3 is thereby stabilized, i.e. an unwanted fall in the frequency of the power transmission grid 3 is opposed.

When the ascertained frequency f of the power transmission grid 3 is too high (over frequency) (if, in other words, the ascertained frequency f is higher than the tolerance range defined by the excess tolerance value $Tol_2$ about the target frequency $f_{soll}$, f>($f_{soll}$+$Tol_2$)), then the method step 620 is carried out. In method step 620, the control device 25 transmits a switching device operation signal 635 to the switching device 21. By means of this switching device operation signal 635, the switching device 21 is (at least periodically) closed. Electrical energy $E_2$ is thereby transmitted out of the power transmission grid 3 via the switching device 21 to the resistor unit 15 where it is converted into heat. Electrical energy $E_2$ is, in other words, thus withdrawn from the power transmission grid 3. The frequency of the alternating current transmitted in the power transmission grid 3 thereby falls; the frequency of the power transmission grid 3 becomes lower. A frequency of the power transmission grid 3 that is higher than desired is thereby opposed.

When the ascertained frequency f of the alternating current transmitted over the power transmission grid 3 lies within a permitted tolerance range (which is formed about the target frequency $f_{soll}$ by the shortfall tolerance value $Tol_1$ and the excess tolerance value $Tol_2$) then method step 625 is carried out. In this method step 625, the multi-level converter 9 is instructed by means of an appropriate operation signal not to remove electrical energy from the energy store 273 and not to feed electrical energy into the power transmission grid 3. When the energy store 273 is not fully charged, the energy store 273 can be charged in method step 625 from the power transmission grid 3 via the modular multi-level converter 9, so that the maximum possible quantity of energy is stored in the energy store 273. The next frequency drop is thereby prepared for. The switching device 21, moreover, remains open during the fifth method step 625, so that no electrical energy is transferred from the power transmission grid 3 to the resistor unit 15. The shortfall tolerance value $Tol_1$ and/or the excess tolerance value $Tol_2$ can also adopt the value zero. After method step 615, 620 or 625, the system continues with method step 605.

The method steps can be summarized as follows.

Method step 605: The frequency f of an alternating current transmitted over the power transmission grid is ascertained.

Method step 610: The ascertained frequency f is compared with the target frequency $f_{soll}$.

Method step 615: Energy is taken from the energy store and fed by means of the converter into the power transmission grid (when f<($f_{soll}$−$Tol_1$)).

Method step 620: The switching device is closed, and passes energy out of the power transmission grid to the resistor unit; this energy is converted into heat in the resistor unit (when f>($f_{soll}$+$Tol_2$)).

Method step 625: The energy stored in the energy store remains in the energy store; the switching device is open (no action when ($f_{soll}$−$Tol_1$)<=f<=($f_{soll}$+$Tol_2$)).

A further exemplary method flow for frequency stabilization of the power transmission grid 3 is illustrated in FIG. 7. This method flow differs from the method flow illustrated in FIG. 6 in that, as an alternative or in addition to an evaluation of the frequency of the alternating current transmitted over the power transmission grid 3, the change over time of this frequency is evaluated.

In the method flow according to FIG. 7, in method step 610' the ascertained frequency f is compared with the target frequency $f_{soll}$ (as in the method flow according to FIG. 6) and/or the change over time of the frequency is compared with a first threshold value x and with a second threshold value y.

In the method flow according to FIG. 7, method step 615 is also carried out when the change over time of the frequency of the alternating current transmitted over the power transmission grid 3 falls below the first threshold value x (df/dt<x; rate of change of the frequency is lower than the first threshold value x). The first threshold value x is negative (negative first threshold value x), and has the unit Hz/s. The method step 620 is also carried out when the change over time of the frequency of the alternating current transmitted over the power transmission grid 3 exceeds the second threshold value y (df/dt>y, rate of change of the frequency is higher than the second threshold value y). The second threshold value y is positive (positive first threshold value y), and has the unit Hz/s.

Method step 625 is carried out when the change over time of the frequency of the alternating current transmitted over the power transmission grid 3 lies between the first threshold value x and the second threshold value y (x<=df/dt<=y) and in particular when the following additionally applies: ($f_{soll}$−$Tol_1$)<=f<=($f_{soll}$+$Tol_2$). The change over time of the frequency (df/dt) is also referred to as the rate of change of frequency (ROCOF).

With the arrangement described and the method described, it is particularly advantageous that the energy store 273 is used exclusively to make energy available for feeding into the power transmission grid in the event of an unwanted drop in frequency. In the event of an unwanted frequency rise in the power transmission grid, in contrast, the energy store 273 is not needed, since in this case electrical energy is withdrawn from the power transmission grid and converted by means of the resistor unit 15 into heat.

An arrangement for frequency stabilization of a power transmission grid with only a multi-level converter 9 and an energy store 273 (without, however, the resistor unit 15 and the switching device 21) would in theory also be conceivable. In this conceivable arrangement, the energy store 273 would be used as a buffer store, both in the event of an unwanted frequency shortfall as well as in the event of an unwanted excess frequency of the power transmission grid. The consequence of this would be that the energy store 273 would have to be not fully charged when ready for operation, but would have to be only partially charged (for example only charged up to 50%, 50% state of charge SOC). This would be necessary so that the energy store could be used at any time for energy absorption or energy output (energy or power absorption with a rising grid frequency, energy or power output with a falling grid frequency). In order to maintain a specific quantity of energy ready in the energy store 273 for the case of a falling grid frequency, the energy store 273 would thus have to be designed with a much larger storage capacity, for example with twice the storage capacity for a 50% SOC. Since energy stores are very costly, this would be very expensive.

As compared with this theoretically conceivable arrangement for frequency stabilization, the arrangement and the method according to FIGS. 1 to 6 have the advantage that the energy store 273 can be charged to its maximum energy content when ready for operation. As a result, the frequency of the power transmission grid 3 can be supported for a comparatively long time in the case of an unwanted drop in frequency in the power transmission grid, or only an energy store of a lower electrical capacity is necessary.

The energy store 273 is thus only used for frequency support in the presence of unwanted frequency drop. The energy store can therefore be fully charged (100% SOC); the total available storage capacity of the energy store 273 can thus be used to support the grid frequency (cf. method step 615). A significant cost advantage thereby results in comparison with the theoretically conceivable arrangement mentioned above. Even when the fact that the resistor unit 15 causes additional costs is taken into account, a significant cost saving results in total. Resistor units of this sort can thus be realized significantly more economically than energy storage units.

The modular multi-level converter 9 can also additionally take over the function of a reactive power compensation plant. The multi-level converter 9 serves in the exemplary embodiment for the stabilization of the grid frequency (that is to say to reduce deviations of the grid frequency from the target frequency). The stabilization or support of the grid frequency takes place here in the case of the grid being under-frequency through feeding energy out of the energy store 273 into the grid, and in the case of an excessive grid frequency through a removal of electrical energy from the grid and a conversion of the electrical energy removed into heat energy (in the resistor unit 15). High electrical energies/ high electrical powers can thus be fed into the grid for a short period (in particular in the range of a few seconds) by means of the energy store 273.

Through connecting in the resistor unit 15, the over-frequency of the power transmission grid 3 is limited through the absorption and conversion of a comparatively large quantity of electrical energy/electrical power. Such resistor units 15 can be relatively simply and economically realized, since they largely consist of the resistor elements (no converters and no stores are necessary for this).

The energy store 273 thus only has to be configured for feeding electrical energy or power into the power transmission grid 3. As opposed to the theoretically conceivable arrangement described above for frequency stabilization with 50% SOC, the electrical energy made available here can be doubled with 100% SOC.

The arrangement described and the method described have a range of advantages. The arrangement and the method can be realized economically, since the comparatively expensive energy store 273 can be designed 100% for feeding energy into the power transmission grid 3. As a result (with a constant energy quantity made available) a smaller energy store can be used or, when the energy store remains the same, a larger quantity of energy can be made available. In the first case, less space is required for the energy store 273, whereby building costs, air-conditioning costs, land costs etc. are also reduced. Again in this case, a significantly smaller number of energy storage units are required, so that the costs for servicing and repair of these energy storage units are also reduced. The availability of the equipment is also improved as a result of the smaller number of energy storage units.

Through the combination of the modular multi-level converter 9 (in particular in the form of a reactive power compensation plant) with the energy store 273 and the resistor unit 15, a simple, economical, robust and reliable solution for limiting under-frequency and over-frequency in power transmission grids is made available. The arrangement described and the method described are in particular suitable for use in the high-voltage and very-high-voltage range, i.e. in high-voltage and very-high-voltage power transmission grids.

With an appropriately robust design of the resistor unit 15, high, pulsed energy inputs into the resistor unit 15 can also occur (through appropriate operation of the switching device 21). The switching device 21 here in particular represents a power switch so that the resistor unit 15 can be connected quickly to the power transmission grid 3 when the frequency is too high. If necessary, the resistor unit 15 can be cooled, for example using a liquid cooling plant. By means of switching the resistor unit 15 rapidly into and out of the power transmission grid 3, the resistor unit 15 can also be employed for what is known as power oscillation damping (POD).

An arrangement and a method have been described with which the frequency of a power transmission grid can be stabilized in an economical manner.

The invention claimed is:

1. An arrangement for frequency stabilization of a power transmission grid, the arrangement comprising:
    a modular multi-level converter having a first terminal for electrical connection to a power transmission grid;
    an electrical resistor unit having a terminal for electrical connection to the power transmission grid; and
    a switching device configured to switchably connect said terminal of said resistor unit to the power transmission grid and to switchably disconnect said terminal of said resistor unit from the power transmission grid;
    the modular multi-level converter configured for feeding electrical energy into the power transmission grid based on a frequency of an alternating current transmitted over the power transmission grid or a change over time of the frequency of the alternating current transmitted over the power transmission grid; and
    said switching device configured to close and connect said terminal of said resistor unit to the power transmission grid to thereby transfer electrical energy from the power transmission grid to said resistor unit and convert the electrical energy to heat by said resistor unit when the frequency of the alternating current transmitted over the power transmission grid exceeds the target frequency by more than a predetermined excess tolerance value or when the change over time of the frequency of the alternating current transmitted over the power transmission grid exceeds a second threshold value.

2. The arrangement according to claim 1, wherein said modular multi-level converter comprises a plurality of modules each including at least two electronic switching elements and an electrical capacitor.

3. The arrangement according to claim 2, wherein:
    said two electronic switching elements are connected in a half-bridge circuit; or
    said modules respectively comprise said two electronic switching elements and two further electronic switching elements, and wherein said two electronic switching elements and said two further electronic switching elements are connected in a full-bridge circuit.

4. The arrangement according to claim 1, further comprising an energy storage device connected to said modular multi-level converter.

5. The arrangement according to claim 4, wherein said energy storage device comprises a plurality of mutually interconnected energy storage units.

6. The arrangement according to claim 5, wherein said energy storage units are selected from the group consisting of capacitors and batteries.

7. The arrangement according to claim 4, further comprising a control device connected to and operating said modular multi-level converter and said switching device to:
when the frequency of the alternating current transmitted over the power transmission grid falls below a target frequency by more than a predetermined shortfall tolerance value, or when a change over time of the frequency of the alternating current transmitted over the power transmission grid falls below a first threshold value, cause the modular multi-level converter to draw electrical energy out of the energy storage device and to feed the electrical energy into the power transmission grid; and
when the frequency of the alternating current transmitted over the power transmission grid exceeds the target frequency by more than the predetermined excess tolerance value, or when the change over time of the frequency of the alternating current transmitted over the power transmission grid exceeds the second threshold value, cause the switching device to close and thereby transfer the electrical energy from the power transmission grid to the resistor unit, whereupon the resistor unit converts the electrical energy into heat.

8. The arrangement according to claim 4, further comprising:
a control device connected to and operating said modular multi-level converter and said switching device to:
when a change over time of the frequency of the alternating current transmitted over the power transmission grid falls below a first threshold value, cause the modular multi-level converter to draw electrical energy out of the energy storage device and to feed the electrical energy into the power transmission grid; and
when the change over time of the frequency of the alternating current transmitted over the power transmission grid exceeds the second threshold value, cause the switching device to close and thereby transfer the electrical energy from the power transmission grid to the resistor unit, whereupon the resistor unit converts the electrical energy into heat.

9. A method for frequency stabilization of a power transmission grid, wherein the power transmission grid is connected to a modular multi-level converter that is connected to an energy storage device, and wherein a switching device switchably connects a terminal of an electrical resistor unit to the power transmission grid and switchably disconnects the terminal of the electrical resistor unit from the power transmission grid, the method comprising:
ascertaining a frequency of an alternating current transmitted over the power transmission grid;
when the frequency thus ascertained falls below a target frequency by more than a predetermined shortfall tolerance value, or when a change over time of the frequency falls below a first threshold value, drawing electrical energy from the energy storage device with the modular multi-level converter and feeding the electrical energy into the power transmission grid; and
when the frequency thus ascertained exceeds the target frequency by more than a predetermined excess tolerance value, or when the change over time of the frequency exceeds a second threshold value, closing the switching device to thereby transfer electrical energy from the power transmission grid to the resistor unit and converting the electrical energy to heat by the resistor unit.

10. The method according to claim 9, wherein:
when the change over time of the frequency falls below the first threshold value, drawing electrical energy from the energy storage device with the modular multi-level converter and feeding the electrical energy into the power transmission grid; and
when the change over time of the frequency exceeds the second threshold value, closing the switching device to thereby transfer electrical energy from the power transmission grid to the resistor unit and converting the electrical energy to heat by the resistor unit.

11. The method according to claim 9, wherein electrical energy is not transferred from the power transmission grid to the resistor unit when the switching device disconnects the terminal of the electrical resistor unit from the power transmission grid.

* * * * *